United States Patent [19]

Sharaby et al.

[11] Patent Number: 4,471,096

[45] Date of Patent: Sep. 11, 1984

[54] PROCESS FOR THE PRODUCTION OF VINYL CHLORIDE POLYMERS IN THE PRESENCE OF A CHAIN-TRANSFER AGENT THAT IS A MERCAPTO ORGANIC COMPOUND HAVING AT LEAST ONE BETA-ETHER LINKAGE

[75] Inventors: Zaev Sharaby, Highland Park; Donald Goodman, Flemington, both of N.J.

[73] Assignee: Tenneco Polymers, Incorporated, Houston, Tex.

[21] Appl. No.: 404,723

[22] Filed: Aug. 3, 1982

[51] Int. Cl.$^3$ .......................... C08F 2/38; C08F 14/06
[52] U.S. Cl. .................................. 526/209; 526/344; 526/344.2; 570/181; 570/189; 570/237; 570/257
[58] Field of Search ..................... 526/209, 344, 344.2; 570/181, 189, 237, 257

[56] References Cited

U.S. PATENT DOCUMENTS

| | | | |
|---|---|---|---|
| 2,460,567 | 2/1949 | Browning | 526/209 |
| 3,557,244 | 1/1971 | Schrage | 526/209 |
| 3,637,623 | 1/1972 | Lo Monaco et al. | 526/209 |
| 3,923,765 | 12/1975 | Goetze et al. | 526/344.2 |

*Primary Examiner*—Harry Wong, Jr.
*Attorney, Agent, or Firm*—Evelyn Berlow

[57] ABSTRACT

Vinyl chloride polymers are prepared by polymerizing a monomer component that comprises vinyl chloride in an aqueous medium in the presence of a free radical-generating polymerization initiator and 0.01% to 2% by weight, based on the weight of the monomer component, of a chain-transfer agent that is a mercapto organic compound having at least one beta-ether linkage. The process can be used to produce low molecular weight vinyl chloride polymers.

6 Claims, No Drawings

PROCESS FOR THE PRODUCTION OF VINYL CHLORIDE POLYMERS IN THE PRESENCE OF A CHAIN-TRANSFER AGENT THAT IS A MERCAPTO ORGANIC COMPOUND HAVING AT LEAST ONE BETA-ETHER LINKAGE

This invention relates to a process for the production of vinyl chloride polymers. More particularly it relates to a process for the production of vinyl chloride polymers having relatively low molecular weights or degrees of polymerization.

BACKGROUND OF THE INVENTION

The processability of a vinyl chloride polymer depends to a large extent upon its average degree of polymerization, with polymers having relatively low molecular weights generally being easiest to fabricate because of their low melt viscosities, low shear sensitivity, good heat stability, and excellent flow characteristics. Because of these desirable processing characteristics, low molecular weight vinyl chloride polymers are widely used in applications in which they are injection molded or extruded to form products that may have thin walls, large surface areas, and deep-draw and/or intricate surface detailed parts. They are also used as processing aids in high molecular weight vinyl chloride homopolymers and copolymers.

In commercial processes for the production of vinyl chloride polymers, chain-transfer agents are used to control the molecular weights of the polymers and thereby form polymers having the desired physical properties.

A wide variety of compounds have been disclosed as being useful as chain-transfer agents in the production of vinyl chloride polymers. These include saturated hydrocarbons, such as hexane and heptane; chlorinated hydrocarbons, such as carbon tetrachloride, trichloroethylene, and perchloroethylene; aldehydes, such as propionaldehyde and butyraldehyde; and mercapto organic compounds, such as dodecyl mercaptan, isooctyl thioglycolate, and 2-mercaptoethanol.

While all of these types of compounds can be used to control the molecular weights of vinyl chloride polymers, there are well-known disadvantages to their use. For example, the saturated hydrocarbons and chlorinated hydrocarbons cause environmental pollution when they are emitted into the atmosphere during processing, storage, and use of the polymer. The aldehydes may be decomposed by heat during the polymerization reaction to form compounds that exert a retarding effect on the reaction.

Mercapto organic compounds, such as alkyl thioglycolates and alkyl mercaptans, must be used in amounts that often impart color and odor to the polymers. Organic compounds that contain both a mercapto group and a hydroxyl group, for example, 2-mercaptoethanol and thiopropylene glycol, are excellent chain-transfer agents. According to Kuwata et al. in U.S. Pat. No. 4,189,552, these compounds, however, must be added portionwise and in low concentrations during the course of the polymerization reaction in order to prevent set-up of the polymerization mixture. When the amounts of these chain-transfer agents that must be present if low molecular weight products are to be obtained are used, extreme care must be exerted in carrying out the polymerization reaction to prevent set-up of the polymerization product.

DETAILED DESCRIPTION OF THE INVENTION

In accordance with this invention, it has been found that mercapto organic compounds having at least one beta-ether linkage are highly efficient chain-transfer agents in the production of vinyl chloride polymers that do not have the disadvantages of the previously-known chain-transfer agents. These chain-transfer agents do not affect the color, odor, and other physical properties of the polymers and do not cause pollution problems. When these chain-transfer agents are used instead of 2-mercaptoethanol or other conventional chain-transfer agents, the polymerization reaction is more efficient and more economical to carry out and there is little or no tendency for the reaction mixture to set up when they are added at the start of the polymerization reaction and/or in the amounts necessary to produce low molecular weight vinyl chloride polymers.

While the chain-transfer agents of this invention are of particular utility in the production of low molecular weight vinyl chloride polymers, that is, polymers having relative viscosities in the range of 1.20 to 1.60 and weight average molecular weights in the range of 22,000 to 45,000, they can also be used to produce polymers having higher molecular weights, that is, polymers having relative viscosities in the range of 1.60 to 1.95 and molecular weights in the range of 45,000 to 86,000, that are characterized by good color and odor, good thermal stability, and other valuable properties.

The chain-transfer agents that are used in the process of this invention are mercapto organic compounds having at least one beta-ether linkage that have the structural formula

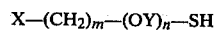

wherein X represents hydrogen or —SH, Y represents an alkylene group having 1 to 6 carbon atoms, and m and n each represents a number in the range of 1 to 10.

A preferred group of chain-transfer agents includes mercapto organic compounds that have the structural formula

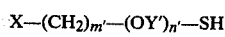

wherein X represents hydrogen or —SH, Y' represents an alkylene group having 2 to 4 carbon atoms, and m' and n' each represents a number in the range of 2 to 4.

Illustrative of the chain-transfer agents that can be used in the practice of this invention are the following compounds:
mercaptomethyl ethyl ether,
2-mercaptoethyl ethyl ether,
2-mercaptoethyl propyl ether,
2-mercaptoethyl butyl ether,
3-mercaptopropyl methyl ether,
3-mercaptopropyl ethyl ether,
3-mercaptopropyl butyl ether,
2-mercaptopropyl isopropyl ether,
4-mercaptobutyl ethyl ether,
bis-(2-mercaptoethyl) ether,
bis-(3-mercaptopropyl) ether,
bis-(4-mercaptobutyl) ether,
(2-mercaptoethyl) (3-mercaptopropyl) ether,
(2-mercaptoethyl) (4-mercaptobutyl) ether,
ethoxypolypropylene glycol mercaptan,
methoxypolyethylene glycol mercaptan, and the like and mixtures thereof.

Among the preferred chain-transfer agents are 2-mercaptoethyl ethyl ether and bis-(2-mercaptoethyl) ether.

The amount of the chain-transfer agent that is used in the polymerization reaction is that which will provide a polymer having the desired molecular weight or degree of polymerization. In most cases from 0.01% to 2% by weight, based on the weight of the monomer component, is used. When a low molecular weight product that has a relative viscosity in the range of 1.20 to 1.60 is desired, the amount of chain-transfer agent used is preferably in the range of 0.25% to 1.75% by weight, based on the weight of the monomer. Amounts in the range of 0.05% to 0.15 by weight, based on the weight of the monomer, are preferably used to produce polymers having high molecular weights.

The process of this invention may be used in the production of polyvinyl chloride as well as copolymers that are formed by the copolymerization of vinyl chloride with a water-insoluble ethylenically-unsaturated monomer that is copolymerizable therewith. Suitable comonomers include vinyl acetate, vinyl propionate, vinyl stearate, vinyl benzoate, ethylene, propylene, methyl methacrylate, ethyl acrylate, allyl acrylate, acrylamide, acrylonitrile, methacrylonitrile, vinylidene chloride, vinyl ethers, dialkyl fumarates and maleates, and the like. When one or more of the aforementioned comonomers are used, the monomer component contains at least 70 percent by weight of vinyl chloride. It is preferred that the monomer component consist essentially of vinyl chloride or that it contain about 80 percent to 90 percent by weight of vinyl chloride and 10 percent to 20 percent by weight of vinyl acetate.

The polymerization reactions of this invention are carried out in the conventional manner using the well-known emulsion or suspension polymerization techniques. In the suspension polymerization process, a vinyl halide or a mixture of a vinyl halide with at least one comonomer is suspended in water by the use of suspending agents and agitation. The polymerization is started by means of a free radical-generating polymerization initiator, such as lauroyl peroxide, benzoyl peroxide, diisopropyl peroxydicarbonate, tertiary butyl peroxypivalate, azobisisobutyronitrile, azobis-(2,4-dimethylvaleronitrile), combinations of dialkyl peroxydicarbonates and lauroyl peroxide, sulfonyl peroxides, and the like. Suspending agents, such as methylcellulose, hydroxymethylcellulose, hydroxyethylcellulose, hydroxypropylmethylcellulose, hydrolyzed polyvinyl acetate, gelatin, methyl vinyl ether-maleic anhydride copolymers, and mixtures thereof, are included in the polymerization reaction mixture. In the emulsion polymerization process, vinyl chloride homopolymers and copolymers are prepared using such initiators as hydrogen peroxide, organic peroxides, persulfates, and redox systems and such surface-active agents as alkyl sulfates, alkane sulfonates, alkylaryl sulfonates, and fatty acid soaps. The polymerization is usually carried out at a temperature in the range of 40° C. to 80° C. The polymers that are produced may be separated from the polymerization mixture and dried by conventional techniques.

The invention is further illustrated by the examples that follow. In these examples, all parts are parts by weight and all percentages are percentages by weight unless otherwise specified.

EXAMPLE 1

A vinyl chloride homopolymer was prepared in a stirred autoclave using a polymerization system that contained 167 parts of deionized water, 0.0406 part of polyvinyl alcohol, 0.1096 part of a cellulose ether derivative, 0.18 part of 2,2'-azobis(2,4-dimethylvaleronitrile), 1.704 part of bis-(2-mercaptoethyl) ether, and 100 parts of vinyl chloride. The polymerization was effected by heating the polymerization system at 70° C. for 4.5 hours. The polyvinyl chloride that was recovered from the polymerization system was dried at 40° C. for 8 hours. There was obtained a 75.8% yield of polyvinyl chloride that had a relative viscosity of 1.30.

EXAMPLE 2

The procedure described in Example 1 was repeated except that the polymerization reaction was carried out at 61° C. for 6 hours. There was obtained an 82% yield of polyvinyl chloride that had a relative viscosity (precipitated sample) of 1.40.

EXAMPLE 3

A series of vinyl chloride polymers was prepared by bottle polymerization by the following procedure: A polymerization system that consisted of 200 parts of deionized water, 0.074 parts of a cellulose ether derivative, 0.19 part of polyvinyl alcohol, 0.08 part of 2,2'-azobis (2,4-dimethylvaleronitrile) 80 parts of vinyl chloride and 0.617 millimole of a chain-transfer agent was heated at 60° C. for 6 hours. At the end of this time, the bottle was vented, the polymer dispersion was filtered, and the recovered polymer was dried at 40° C. for 8 hours.

The chain-transfer agents that were used were either mercapto compounds having a beta-ether linkage or a comparative chain-transfer agent. The chain-transfer agents that were used and the results obtained are set forth in Table I.

TABLE I

| | Chain-transfer Agent | Amount of Chain-transfer Agent (Parts per 80 Parts monomer) | Conversion of Monomer (%) | Relative Viscosity of PVC |
|---|---|---|---|---|
| Ex. No. | | | | |
| 3A | 2-Mercaptoethyl ethyl ether | 0.065 | 88.8 | 1.79 |
| 3B | Bis-(2-mercaptoethyl) ether | 0.085 | 90.2 | 1.76 |
| Comparative Examples | | | | |
| 1 | 2-Mercaptoethanol | 0.048 | 91.0 | 1.82 |
| 2 | Mercaptopropionic Acid | 0.065 | 88.9 | 1.85 |
| 3 | 2-Mercaptoethyl Acetate | 0.074 | 91.7 | 1.85 |
| 4 | Mercaptoacetic acid | 0.057 | 92.6 | 1.86 |
| 5 | Mercaptoethyl- | 0.138 | 86.6 | 1.88 |

TABLE I-continued

| | Chain-transfer Agent | Amount of Chain-transfer Agent (Parts per 80 Parts monomer) | Conversion of Monomer (%) | Relative Viscosity of PVC |
|---|---|---|---|---|
| | triethoxysilane | | | |
| 6 | Isooctyl thioglycolate | 0.126 | 93.5 | 1.90 |
| 7 | o-Mercaptobenzyl alcohol | 0.080 | 81.0 | 1.91 |
| 8 | Thiosalicylic Acid | 0.095 | 89.2 (set-up) | 1.92 |
| 9 | 3-Mercaptopropvl 1,2-propanediol | 0.067 | 91.5 | 1.92 |
| 10 | (3-Mercaptopropyl)-trimethyoxysilane | 0.100 | 92.7 | 2.04 |
| 11 | Mercaptosuccinic Acid | 0.093 | 91.8 | 2.05 |
| 12 | Trichloroethylene | 0.080 | 93.6 | 2.05 |

EXAMPLE 4

The procedure described in Example 3 was repeated using larger amounts of the chain-transfer agents.

The chain-transfer agents and the amounts of each that were used and the results obtained are set forth in Table II.

TABLE II

| | | Amt. of Chain-transfer Agent Used | | Conversion | |
|---|---|---|---|---|---|
| | Chain-transfer Agent | mmol. | Parts per 80 parts monomer | of Monomer (%) | Relative Viscosity of PVC |
| Ex. No. | | | | | |
| 4A | 2-Mercaptoethyl ethyl ether | 1.234 | 0.13 | 88.0 | 1.69 |
| 4B | 2-Mercaptoethyl ethyl ether | 2.468 | 0.26 | 82.9 | 1.60 |
| 4C | 2-Mercaptoethyl ethyl ether | 4.936 | 0.52 | 79.4 | 1.50 |
| 4D | Bis-(2-mercaptoethyl) ether | 1.234 | 0.17 | 87.7 | 1.66 |
| 4E | Bis-(2-mercaptoethyl) ether | 2.468 | 0.34 | 81.7 | 1.54 |
| 4F | Bis-(2-mercaptoethyl) ether | 4.936 | 0.68 | 78.1 | 1.46 |
| Comparative Examples | | | | | |
| 13 | 1-Mercapto-2-butene | 2.468 | 0.27 | 29.7 | 1.57 |
| 14 | 2-Mercaptoethanol | 1.234 | 0.10 | 91.3* | 1.70 |
| 15 | 2-Mercaptoethanol | 2.468 | 0.20 | 87.3* | 1.61 |
| 16 | 2-Mercaptoethanol | 4.936 | 0.40 | 83.1* | 1.50 |
| 17 | Mercaptopropionic Acid | 1.234 | 0.13 | 91.9* | 1.81 |
| 18 | 2-Mercaptoethyl Acetate | 1.234 | 0.15 | 92.6 | 1.79 |
| 19 | 2-Mercaptoethyl Acetate | 2.468 | 0.30 | 89.4 | 1.69 |
| 20 | 2-Mercaptoethyl Acetate | 4.936 | 0.60 | 88.9 | 1.60 |
| 21 | Trichloroethylene | 1.234 | 0.16 | 95.7 | 2.00 |
| 22 | Trichloroethylene | 2.468 | 0.32 | 94.2 | 1.98 |
| 23 | Trichloroethylene | 4.936 | 0.64 | 96.6 | 1.88 |
| 24 | None | — | — | — | 2.08 |

*Set up

When the products of Examples 4A-F were substituted for an ethylene-vinyl chloride copolymer as the processing aid in a composition containing high molecular weight polyvinyl chloride, the impact resistance of the resulting compositions was increased by about 10%.

From the data in Tables I and II, it will be seen that when equimolar amounts of the chain-transfer agents were used, mercapto compounds having beta-ether linkages were in most cases more effective in controlling the molecular weight of the polymer than the commercially-used chain-transfer agents of Comparative Examples 1-23. Even when the chain-transfer agents of this invention were added initially and in excess, the polymerization systems, unlike many of those containing the comparative chain-transfer agents, showed little or no tendency to set up.

Each of the other beta-ether linkage-containing mercapto compounds disclosed herein can be used in a similar way as the chain-transfer agent in the polymerization of monomer components that comprise vinyl chloride.

What is claimed is:

1. In the process for the production of vinyl chloride polymers that comprises polymerizing a monomer component selected from the group consisting of vinyl chloride and mixtures of vinyl chloride with at least one ethylenically-unsaturated comonomer that is copolymerizable therewith, said mixture containing at least 70% by weight of vinyl chloride, in an aqueous medium at a temperature in the range of 40° C. to 80° C. in the presence of a free radical-generating polymerization initiator and 0.01% to 2% by weight, based on the weight of the monomer component, of a chain-transfer agent, the improvement wherein the chain-transfer agent is an aliphatic compound having the structural formula X—(CH$_2$)$_m$—(OY)$_n$—SH wherein X represents hydrogen or —SH, Y represents an alkylene group having 1 to 6 carbon atoms, and m and n each represents a number in the range of 1 to 10.

2. The process of claim 1 wherein the chain-transfer agent has the structural formula X—(CH$_2$)$_{m'}$—(OY')$_{n'}$—SH wherein X represents hydrogen or —SH, Y' represents an alkylene group having 2 to 4 carbon atoms, and m' and n' each represents a number in the range of 2 to 4.

3. The process of claim 1 wherein the chain-transfer agent is 2-mercaptoethyl ethyl ether.

4. The process of claim 1 wherein the chain-transfer agent is bis-(2-mercaptoethyl) ether.

5. The process of claim 1 wherein from 0.25% to 1.75% by weight, based on the weight of the monomer component, of the chain-transfer agent is used and the vinyl chloride polymer produced has a relative viscosity in the range of 1.20 to 160.

6. The process of claim 1 wherein the monomer component consists essentially of vinyl chloride.

* * * * *